US011420175B2

(12) United States Patent
Zhang et al.

(10) Patent No.: US 11,420,175 B2
(45) Date of Patent: Aug. 23, 2022

(54) DIFFERENTIAL HYDROGENATION REACTION APPARATUS

(71) Applicants: BEIJING JIESENCHUANGXIN SCIENCE&TECHNOLOGY DEVELOPMENT CO. LTD., Beijing (CN); Qikai Zhang, New Maryland (CA)

(72) Inventors: Qikai Zhang, New Maryland (CA); Penghui Xu, Dongying (CN); Qun Gao, Beijing (CN)

(73) Assignees: BEIJING JIENSENCHUANGXIN SCIENCE & TECHNOLOGY DEVELOPMENT CO., LTD., Beijing (CN); Qikai Zhang, New Maryland (CA)

( * ) Notice: Subject to any disclaimer, the term of this patent is extended or adjusted under 35 U.S.C. 154(b) by 0 days.

(21) Appl. No.: 17/100,974

(22) Filed: Nov. 23, 2020

(65) Prior Publication Data

US 2021/0154638 A1    May 27, 2021

(30) Foreign Application Priority Data

Nov. 26, 2019  (CN) .......................... 201911175767.7

(51) Int. Cl.
*B01J 19/00* (2006.01)

(52) U.S. Cl.
CPC .. *B01J 19/0093* (2013.01); *B01J 2219/00792* (2013.01); *B01J 2219/00862* (2013.01);
(Continued)

(58) Field of Classification Search
CPC ...... B01J 19/00; B01J 19/008; B01J 19/0093; B01J 19/24; B01J 19/2405; B01J 2219/00;
(Continued)

(56) References Cited

U.S. PATENT DOCUMENTS

2004/0081600 A1 *   4/2004   Moreno ............... B01J 19/0093
                                                422/240

FOREIGN PATENT DOCUMENTS

CN         1406151 A       3/2003
CN       101588864 A      11/2009
(Continued)

OTHER PUBLICATIONS

CN search report re: Application No. 201911175767.7. 2019.
(Continued)

*Primary Examiner* — Natasha E Young
(74) *Attorney, Agent, or Firm* — Gang Yu (57) ABSTRACT

The present disclosure provides a differential hydrogenation reaction apparatus. The apparatus comprises a mixing vessel, a plurality of microreactors and a raw material conveying device, and the mixing vessel is provided with reaction product inlets; each microreactor is used as a hydrogenation reaction place and is provided with a liquid phase reaction raw material inlet and a reaction product outlet, each reaction product outlet is connected with the corresponding reaction product inlet, the plurality of microreactors are divided into one group or a plurality of groups which are arranged in parallel, and each group comprises at least one microreactor arranged in parallel; and the raw material conveying device is arranged on a feeding pipeline of the liquid phase reaction raw material inlet. The problems of high pressure unsafety and non-equilibrium in the hydrogenation reaction process can be effectively solved by adopting the reaction apparatus.

17 Claims, 4 Drawing Sheets

(52) U.S. Cl.
CPC .............. *B01J 2219/00869* (2013.01); *B01J 2219/00894* (2013.01)

(58) Field of Classification Search
CPC .... B01J 2219/00049; B01J 2219/00051; B01J 2219/00157; B01J 2219/00781; B01J 2219/00788; B01J 2219/00792; B01J 2219/00819; B01J 2219/00835; B01J 2219/00851; B01J 2219/00858; B01J 2219/00862; B01J 2219/00869; B01J 2219/00889; B01J 2219/00891; B01J 2219/00894

See application file for complete search history.

(56) References Cited

FOREIGN PATENT DOCUMENTS

| | | |
|---|---|---|
| CN | 102020632 A | 4/2011 |
| CN | 202179961 U | 4/2012 |
| CN | 106215828 A | 12/2016 |
| CN | 206746525 U | 12/2017 |
| CN | 108409516 A | 8/2018 |
| CN | 109985572 A | 7/2019 |
| CN | 110152588 A | 8/2019 |
| CN | 211677662 U | 10/2020 |

OTHER PUBLICATIONS

Yan, Jifeng. "Slug flow and hydrogenation reaction characteristics in serpentine microchannel with catalytic walls". China Master's Theses Full-text Database. Jun. 15, 2016 (Jun. 15, 2016).

\* cited by examiner

DIFFERENTIAL HYDROGENATION REACTION APPARATUS

This application claims foreign priority to Chinese Patent Application No. 201911175767.7, filed Nov. 26, 2019, the disclosure of which is incorporated herein in its entirety by reference.

TECHNICAL FIELD

The present disclosure relates to the chemical field, in particular to a differential hydrogenation reaction apparatus.

BACKGROUND

The scale of chemical enterprises becomes larger and the yield of a single machine becomes increased caused by scale benefit of the chemical industry. By taking the most commonly used reacting kettles in the chemical enterprises as examples, the volume is increased to 10 m$^3$-100 m$^3$ from past 1000 L-5000 L, and reported that the volume of a foreign fermentation reaction tank achieves 3200 m$^3$. With continuous increase of the reactor, the problem, must to be solved, of reduction in reaction quality caused by the unbalanced reaction phenomenon in the reactor occurs. For example, for a large-capacity reactor, differences of heat transport, quality transport and momentum transport occur between materials at different positions in the reactor, which causes unbalanced reaction of unstable quality of a product. However, the non-equilibrium of such reaction is in proportion to the volume of the reactor, and thus the larger the reactor is, the more serious the non-equilibrium phenomenon is. In order to eliminate non-equilibrium of the reactor and momentum transport, energy transport, quality transport and reaction engineering of acceleration, the chemical reactor is generally arranged as a stirring reactor. However, stirring reaction is limited by the capacity of the reactor, and for a large or ultra-large reactor, a mode of directly arranging a stirring paddle is infeasible. Hence, the large scale requirement of the reactor and the non-equilibrium phenomenon caused by large scale of the reactor severely form a pair of contradictions in the chemical reaction.

Hydrogenation reaction is one of the most common reactions in industry and widely exists in industries such as the refining industry, the chemical industry, the pharmaceutical industry, the food industry and the agricultural industry. As hydrogen is very light and energy of a hydrogen bond is high, hydrogenation reaction has two common points that A, all processes adopt high-pressure hydrogenation, the very light hydrogen is pressurized into a liquid phase material to participate to reaction, and a generally used hydrogen pressure range is 5 MPa-50 MPa; and B, in all the processes, the hydrogen always participates to material reaction in a very high ratio, and a ratio of a general hydrogen standard volume to a material volume is 500-1000.

To sum up, the large or ultra-large hydrogenation reactor must have the following problems of A, safety problem: high pressure or ultra-high pressure hydrogenation reactor has the danger of having leakage and then causing explosion, and the hydrogen may generate strong effects of hydrogen attack and hydrogen embrittlement to a metal wall face of the reactor, such that the reactor has a tiny breaking point to cause leakage. In order to prevent leakage of the reactor, a high-intensity material and a thickness of thickened metal wall face must be adopted, for example, specifications of a fixed-bed high-pressure hydrogenation reactor manufactured in China in 1999 are as follows:

inside diameter: 4000 mm; inside circumference: 23016 mm; wall thickness: 176.5 mm;

gross weight: 366T; pressure: 19.95 MPa; temperature: 435° C.

Therefore, the thickness of the wall face of a reactor of only 20 MPa approaches 20 cm. Thus, the first question brought by large or ultra-large high-pressure hydrogenation reactor is the safety problem, and in other words, for running safety of the reactor, high investment must be required to obtain a reactor made of a high-quality material and having ultra thickness of a wall;

B, unbalanced reaction problem: known by tests from micromolecular aspect, the time required for breakage and rebonding of molecular bonds is only from a few microseconds to tens of microseconds, but as for the large or ultra-large reactor, a residence time (of about 1 h generally) of a material in the reactor must be prolonged for balanced reaction. Theoretically, reaction is completely balanced only when the residence time of the material is infinitely large; and however, prolonging of the residence time means reduction in productivity.

Based on the above reasons, it is necessary to provide a novel hydrogenation reaction process to overcome the high pressure unsafety problem and the unbalanced reaction problem generally existing in the hydrogenation reaction process.

SUMMARY

A primary objective of the present disclosure is to provide a differential hydrogenation reaction apparatus to solve the high pressure unsafety problem and the unbalanced reaction problem generally existing in the hydrogenation reaction process in the prior art.

In order to accomplish the above object, according to one aspect of the present disclosure, provided is a differential hydrogenation reaction apparatus which includes mixing vessel with reaction product inlets, a plurality of microreactors used as hydrogenation reaction places of a liquid phase reaction raw material and a raw material conveying device; each microreactor is provided with a liquid phase reaction raw material inlet and a reaction product outlet, each reaction product outlet is connected with the corresponding reaction product inlet, the plurality of microreactors are divided into one group or a plurality of groups which are arranged in parallel, and each group includes at least one microreactor arranged in parallel; each microreactor in each group is a pressurized microreactor with a volume smaller than or equal to 0.025m3 and an inside diameter smaller than 0.1 m, or an atmospheric microreactor with a volume smaller than or equal to 0.1 m3 and an inside diameter smaller than 0.1 m; and a raw material conveying device is arranged on a feeding pipeline of the liquid phase reaction raw material inlet and is used for conveying the liquid phase reaction raw material into the microreactors.

Furthermore, the mixing vessel is further provided with a mixed material outlet, the differential hydrogenation reaction apparatus further includes a forced circulation apparatus, and the forced circulation apparatus includes: a circulation pipeline, an inlet of which is connected with the mixed material outlet and an outlet of which is connected with a liquid phase reaction raw material inlet; and a forced circulation pump, arranged on the circulation pipeline.

Furthermore, the mixing vessel is provided with a cavity, the cavity is internally provided with a non-submersed impinging stream assembly, the non-submersed impinging stream assembly is used for further performing non-submersed impinging, cavitation and shearing on a hydrogenation reaction product which enters from the reaction product inlet and goes out from the microreactors.

Furthermore, the non-submersed impinging stream assembly includes a cylinder, an inner cavity of the cylinder is used for providing a non-submersed impinging place, a wall of the cylinder is provided with a plurality of first hole structures, and an included angle is arranged between an axial direction of each first hole structure and an axial direction of the cylinder.

Furthermore, the cylinder is provided with inlets at the two ends, the mixing vessel is provided with two groups of reaction product inlets, each group of which includes at least one reaction product inlet, and the two groups of the reaction product inlets are arranged on the two sides of the mixing vessel respectively, wherein a part of the reaction product outlets are connected with one group of the reaction product inlets respectively, the other part of the reaction product outlets are connected with the other group of the reaction product inlets respectively, and the hydrogenation reaction products entering from the two groups of reaction product inlets enter the cylinder from the inlets at the two ends of the cylinder in a manner of an ejection fluid and are subjected to non-submersed impinging.

Furthermore, an inlet is formed in one end of the cylinder, and an impinging bottom plate is arranged at the other end of the cylinder; or an inlet is formed in one end of the cylinder, a radial sectional area of the cylinder is gradually reduced in a direction far away from the inlet end, and the other end of the cylinder is closed, wherein the reaction product inlets are all connected with the inlet end of the cylinder to be used for enabling the hydrogenation reaction products to enter the cylinder in the manner of the ejection fluid and are subjected to non-submersed impinging.

Furthermore, the non-submersed impinging stream assembly is arranged at the position, close to the top end, of the cavity of the mixing vessel.

Furthermore, each microreactor is of a tubular structure with a length-diameter ratio of (10-20) to 1.

Furthermore, each microreactor is further internally provided with a plurality of pipeline cavitation plates, each of which is provided with a plurality of second hole structures.

Furthermore, the pipeline cavitation plates are vertically or obliquely arranged in the corresponding microreactors in an axial direction.

Furthermore, two adjacent pipeline cavitation plates are the same or opposite in an oblique direction in each microreactor.

Furthermore, the differential hydrogenation reaction apparatus further includes a heating apparatus, and the heating apparatus is used for heating the microreactors and the mixing vessel.

Furthermore, the forced circulation apparatus further includes pipeline type heating furnaces, and the pipeline type heating furnaces are used for heating the circulation pipeline.

Furthermore, the circulation pipeline is further provided with hydrogen inlets to be used for introducing hydrogen into the circulation pipeline.

Furthermore, a gaseous product outlet is further formed in the top of the mixing vessel, the differential hydrogenation reaction apparatus further includes a condenser, the condenser is provided with a gaseous product inlet, a condensate outlet and a tail gas outlet, and the gaseous product inlet is connected with the gaseous product outlet.

Furthermore, the tail gas outlet is connected with the hydrogen inlets.

Furthermore, each microreactor is filled with a hydrogenation catalyst, and/or is added with a high electric field component and/or is added with a photocatalysis component.

The present disclosure provides a differential hydrogenation reaction apparatus which includes mixing vessel, a plurality of microreactors and a raw material conveying device; the mixing vessel is provided with reaction product inlets; each microreactor is used as a hydrogenation reaction place of a liquid phase reaction raw material and is provided with a liquid phase reaction raw material inlet and a reaction product outlet, each reaction product outlet is connected with the corresponding reaction product inlet, the plurality of microreactors are divided into one group or a plurality of groups which are arranged in parallel, and each group includes at least one microreactor arranged in parallel; each microreactor in each group is a pressurized microreactor with a volume smaller than or equal to 0.025 m3 and an inside diameter smaller than 0.1 m, or an atmospheric microreactor with a volume smaller than or equal to 0.1 m3 and an inside diameter smaller than 0.1 m; and the raw material conveying device is arranged on a feeding pipeline of the liquid phase reaction raw material inlet and is used for conveying a liquid phase reaction raw material into the microreactors. The problems of unsafety and non-equilibrium of high pressure generally existing in the hydrogenation reaction process at present can be effectively solved by adopting the reaction apparatus of the present disclosure. Simultaneously, the investment of the differential hydrogenation reaction apparatus would be greatly lower than that of a large or ultra-large high-pressure hydrogenation reactor; the safety of the differential hydrogenation reaction apparatus is greatly higher than that of the large or ultra-large high-pressure hydrogenation reactor; and overhaul and maintenance of the differential hydrogenation reaction apparatus may be implemented under the condition without stopping running of equipment, the economic benefit and the running flexibility of the differential hydrogenation reaction apparatus is also larger than those of an existing large high-pressure hydrogenation reactor, and safe and economic social requirements are implemented on the premise of invariability in production efficiency and reaction effect.

BRIEF DESCRIPTION OF THE DRAWINGS

Accompanying drawings of the specification, constituting part of the present application, is used for providing a further understanding of the present disclosure, the illustrative embodiments of the present disclosure and descriptions thereof are to illustrate the present disclosure, and the present disclosure is not limited thereto. In the drawings.

wherein the above drawings includes following reference numerals:

10. mixing vessel; 101. reaction product inlet; 102. mixed material outlet; 103. gaseous product outlet; 11. non-submersed impinging stream assembly; 20. microreactor; 201. liquid phase reaction raw material inlet; 202. reaction product outlet; 30. forced circulation apparatus; 31. circulation pipeline; 32. forced circulation pump; 33. pipeline type heating furnace; 311. hydrogen inlet; 40. condenser; 50. condensate receiving apparatus.

DETAILED DESCRIPTION OF THE EMBODIMENTS

It should be noted that the examples of the present application and the characteristics in the examples can be combined with other another without conflict. The present disclosure will be described below in detail with reference to the accompanying drawings and in combination with the embodiments.

As described in the background, the high pressure unsafety problem and the unbalanced reaction problem generally exist in the hydrogenation reaction process in the prior art.

Figure 1:
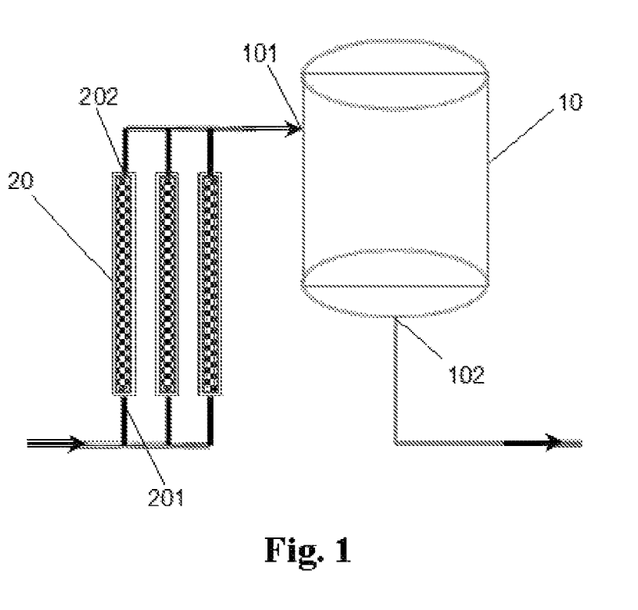
FIG. 1 shows a schematic diagram of a differential hydrogenation reaction apparatus according to one embodiment.

In order to solve the above problems, the present disclosure provides a differential hydrogenation reaction apparatus, as shown in FIG. 1, which includes mixing vessel 10, a plurality of microreactors 20 and a raw material conveying device; the mixing vessel 10 is provided with reaction product inlets 101; each microreactor 20 is used as a hydrogenation reaction place of a liquid phase reaction raw material and is provided with a liquid phase reaction raw material inlet 201 and a reaction product outlet 202, each reaction product outlet 202 is connected with the corresponding reaction product inlet 101, the plurality of microreactors 20 are divided into one group or a plurality of groups which are arranged in parallel, and each group includes at least one microreactor 20 arranged in parallel; each microreactor 20 in each group is a pressurized microreactor with a volume smaller than or equal to 0.025 m3 and an inside diameter smaller than 0.1 m, or an ambient-pressure microreactor with a volume smaller than or equal to 0.1 m3 and an inside diameter smaller than 0.1 m; and the raw material conveying device is arranged on a feeding pipeline of the liquid phase reaction raw material inlet 201 and is used for conveying a liquid phase reaction raw material into the microreactors 20.

The present disclosure uses small or ultra-small differential hydrogenation reaction apparatus to replace the large or ultra-large integral reactor. In the actual operation process, as the time required for breakage and rebonding of molecular bonds is only from a few microseconds to tens of microseconds, in the present disclosure, the raw material conveying device is used to introduce liquid phase reaction raw materials for hydrogenation reaction into the microreactors 20, in which the reaction raw materials are forced to closely contact mutually in a plurality of narrow spaces and being capable of rapidly finishing hydrogenation reaction. Then a product obtained by reaction enters the mixing vessel 10 for mixing. The narrow interiors of the microreactors 20 are basically under the same process condition, and therefore, the problem of non-equilibrium in the hydrogenation reaction process at present is effectively solved, and the conversion rate of reaction is guaranteed. Simultaneously, as hydrogenation reaction of the liquid phase reaction raw material is rapidly finished through the microreactors 20, the microreactors 20 also have relatively high reaction efficiency (generally, a length of each microreactor 20 needs to be set with the retention time of the raw material being 1-2 magnitudes of the time required for breakage-bonding of the molecular bonds only, and generally, the retention time of the raw material in each microreactor needs to be 0.1-100 millisecond only). More importantly, each microreactor 20 is a pressurized microreactor with a volume smaller than or equal to 0.025m3 and an inside diameter smaller than 0.1 m or an ambient-pressure microreactor with a volume smaller than or equal to 0.1m3 and an inside diameter smaller than 0.1 m, which is not treated as a pressure vessel, such that very great advantages are brought to investment and running economy of hydrogenation equipment. Moreover, even if the microreactor 20 belongs to a pressure vessel, the size of the microreactor is small, which facilitates operation, and has higher safety.

In a word, the problems of unsafety and non-equilibrium of high pressure generally existing in the hydrogenation reaction process at present can be effectively solved by adopting the reaction apparatus of the present disclosure. Simultaneously, the investment of the differential hydrogenation reaction apparatus would be greatly lower than that of a large or ultra-large high-pressure hydrogenation reactor; the safety of the differential hydrogenation reaction apparatus is greatly higher than that of the large or ultra-large high-pressure hydrogenation reactor; and overhaul and maintenance of the differential hydrogenation reaction apparatus may be implemented under the condition without stopping running of equipment, the economic benefit and the running flexibility of the differential hydrogenation reaction apparatus is also larger than those of an existing large high-pressure hydrogenation reactor, and safe and economic social requirements are implemented on the premise of invariability in production efficiency and reaction effect.

It is noted that the liquid phase reaction raw materials herein may be the following several raw materials: 1. a single liquid phase material; 2. a mixed material with a liquid phase being a dense phase and a gas phase being a dilute phase; 3. a mixed material with a liquid phase being the dense phase and a solid phase being the dilute phase; and 4. a mixed material with a liquid phase being the dense phase and a gas phase and a solid phase being the dilute phase.

Furthermore, the above situation "the plurality of microreactors 20 are divided into one group or a plurality of groups which are arranged in parallel, and each group includes at least one microreactor 20 arranged in parallel; each microreactor 20 in each group is the pressurized microreactor with the volume smaller than or equal to 0.025 m3 and the inside diameter smaller than 0.1 m or the ambient-pressure microreactor with the volume smaller than or equal to 0.1 m3 and the inside diameter smaller than 0.1 m" refers to that the plurality of microreactors 20 are divided into one group or a plurality of groups which are arranged in parallel, for example, four microreactors 20 are divided into pairs or into three groups with a first group of two, a second group of one and a third group of one. The objective of dividing the microreactors into a plurality of groups is to need that types of one or more microreactors 20 in parallel in each group are same, for example, same as an ambient pressure type or a pressurized type. Each group may be provided with a total feeding hole which is connected with the liquid phase reaction raw material inlet 201 of each microreactor 20, such that a same feed liquid enters one group of the microreactors 20 and may be subjected to hydrogenation reaction in a pressurized state or an ambient pressure state similarly.

The differential hydrogenation reaction apparatus provided by the present disclosure may be a differential pressurized reaction apparatus and also a differential ambient-pressure reaction apparatus. When the differential hydrogenation reaction apparatus is used as the differential ambient-pressure reaction apparatus, the aperture of an outlet of each microreactor 20 may be directly opened to run under ambient pressure. When the differential hydrogenation reaction apparatus is used as the differential pressurized reaction apparatus, a required pressure environment in each microreactor 20 may be implemented through matching of the raw material conveying device as well as the outlet and the inside diameter of each microreactor 20.

As stated above, the interiors of the microreactors 20 are basically under the same process condition, and the reaction equilibrium is guaranteed. However, any chemical reaction has the randomness, and a few non-equilibrium condition and the condition that a few unfinished materials exists inevitably exist and may be solved in a serial connection manner in order to further eliminate non-equilibrium of a such product.

Figure 2:
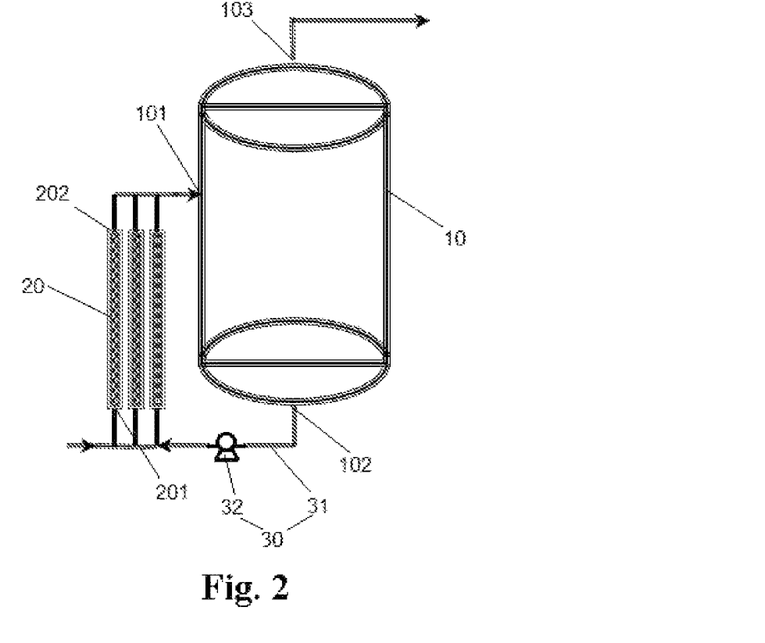
FIG. 2 shows a schematic diagram of a differential hydrogenation reaction apparatus according to another embodiment.

In a preferred embodiment, as shown in FIG. 2, the mixing vessel 10 is further provided with a mixed material outlet 102, the differential hydrogenation reaction apparatus further includes a forced circulation apparatus 30, and the forced circulation apparatus 30 includes a circulation pipeline 31, an inlet of which is connected with the mixed material outlet 102 and an outlet of which is connected with a liquid phase reaction raw material inlet 201; and the forced circulation apparatus 32 is arranged on the circulation pipeline 31. Therefore, the materials which are not thoroughly reacted may reenter the microreactors 20 through the forced circulation apparatus 30 for reaction. Certainly, such a serial connection manner is more suitable for hydrogenation reaction type of mixing the raw materials with the product without influencing the quality of the product, for example, hydrocracking of residual oil, hydrorefining of gasoline and diesel oil and the like.

In an embodiment not show in the drawings, a plurality of groups of differential hydrogenation reaction apparatuses may further be arranged in series; in each group of the differential hydrogenation reaction apparatus, a mixed material outlet 102 is formed in the bottom of each mixing vessel 10; and in two adjacent groups of the differential hydrogenation reaction apparatuses, the mixed material outlet 102 of each mixing vessel 10 in the upstream group is connected with liquid phase reaction raw material inlets 201 of microreactors 20 in the downstream group. Therefore, the situation is equivalent to that liquid phase reaction raw materials sequentially pass through the plurality of groups of differential hydrogenation reaction apparatuses for hydrogenation reaction, the mixing vessel 10 is arranged between two adjacent groups of the microreactors 20, at the time, the mixing vessels 10 are intended to eliminate the non-equilibrium among the products of the microreactors 20, and therefore, the vessels may be non-pressure common vessels with very low cost, the volume of each vessel is relevant to the non-equilibrium of the products, and the larger each vessel is, the equilibrium of the products after being mixed is better. Furthermore, such serial connection mode is more suitable for the conditions that a hydrogenation product is a single product, increase in yield, improvement in quality of the products or separation of the products from the raw materials are not facilitated by mixing the products with the raw materials, for example, production of sorbitol with hydrogenation of glucose, hydrogenation production of some pesticide intermediates and the like.

In the specific operation process, the number of the serial groups (or cycle number) of the microreactors 20 is relevant to one-time reaction conversion rate of the raw materials in the reactor. For example, the conversion rate of the raw materials is 80% when the raw materials pass through one group of the reactor; if the conversion rate is invariable, the product conversion rate achieves 96% when the raw materials pass through two groups of serial reactors, and the product conversion rate achieves 99.2% when the raw materials pass through three groups of serial reactors. In fact, the raw materials continuously cycle in the reactors, and the conversion rates are different with continuous change of components of the materials, such that the cycle number of the materials in the reactors generally need to be determined by calculating parameter designs of requirements for the purity of the products, the one-time conversion rates of the reactors and the like, which should be known to one skilled in the art and will not be described in more detail herein.

With exception of serial connection, the number of the microreactors 20 in parallel may be decided by the input material treatment quantity specified by the process, and 10%-50% backup rate reserve quantity is received. For example, according to the specifications of the process, if only one microreactor is needed, two microreactors may be used for running in parallel, i.e. with one for running and the other for standby (with the backup rate being 50%); if 10 microreactors are needed for running in parallel in the process, 12 microreactors are connected in parallel (with the backup rate being 20%) and the like. These may be set by those skilled in the art in the actual operation process. For each microreactor 20, the material and the strength may be designed according the allowable pressure specified by the process, and a withstand pressure range is generally (1-50) MPa; and the pressure of each microreactor 20 is matched with the pressure of a pump for the input material and the inside diameter of the reactor outlet to meet the needs for the pressure in the vessel. For industrial scale, when all the microreactors 20 in parallel runs, and pipelines and liquid pumps of the microreactors 20 are all fully filled with the materials, the materials in the reactors, the pipelines and the pumps only account for 1-3% of a total material in the vessels, and in other words, the situation that the materials in the vessels are pumped due to running of all the microreactors to cause idling of the liquid pump cannot occur.

Figure 3:
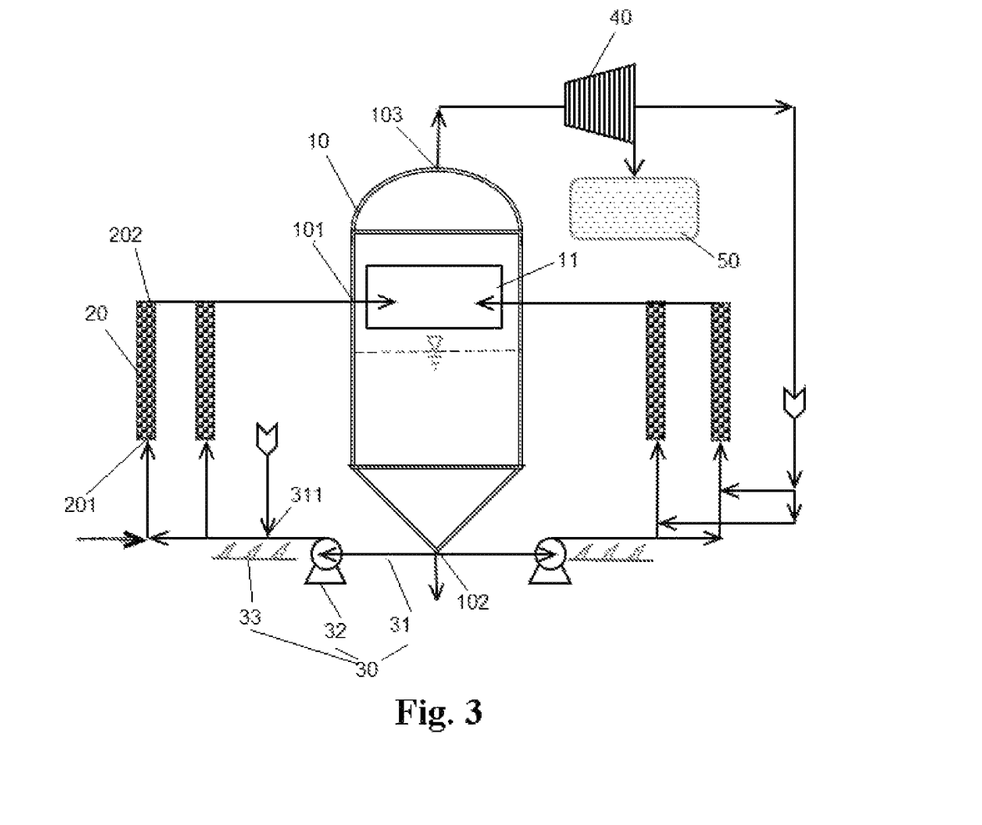
FIG. 3 shows a schematic diagram of a differential hydrogenation reaction apparatus according to another embodiment.

The mixing vessel 10 only acts as an ambient-pressure homogenizing collection vessel generally and is used for mixing products outgoing from the plurality of the microreactors 20 for enhancing the equilibrium. In order to increase the hydrogenation conversion rate and improve the reaction efficiency, in one preferred embodiment, as shown in FIG. 3, the mixing vessel 10 is provided with a cavity, the cavity is further internally provided with a non-submersed impinging stream assembly 11. The non-submersed impinging stream assembly 11 is used for further performing non-submersed impinging, cavitation and shearing on reaction products which enter the mixing vessel from a reaction product inlet 101 and go out from the microreactors 20. The outlet velocity of each reaction product out from an outlet of the corresponding microreactor 20 is no less than 5 m/s generally and is generally controlled in a range of (5-10)m/s. By performing non-submersed impinging, cavitation and shearing on each reaction product which gets high-speed kinetic energy, the hydrogenation effect can be further improved.

In a preferred embodiment, an non-submersed impinging stream assembly 11 includes a cylinder, an inner cavity of the cylinder is used for providing a non-submersed impinging place, a wall of the cylinder is provided with a plurality of first hole structures, and an included angle is arranged between an axial direction of each first hole structure and an axial direction of the cylinder. The axial direction of each first hole structure herein refers to a through hole direction of each first hole structure, that is an extension direction of each hole. The cylinder is provided with plurality of first hole structures, such that an ejection fluid of a raw material liquid is drained from the first hole structures after entering the inner cavity for impinging; and an environment of the inner cavity of the cylinder is always a gas environment, such that the ejection fluid of the raw materials is always be subjected to the non-submersed impinging process. The impinging time of the ejection fluid is very short and reaches milliseconds. After impinging happen instantly, a flow direction of a fluid is forced to change into a direction, near orthogonal to a direction in which an original ejection fluid enters, to form a second fluid. The "second fluid", the direction of which is forced to be changed, still has a very high initial velocity; after the second fluid impinges the cylinder with the plurality of first hole structures, as an included angle is formed between the axial direction of each first hole structure and the axial direction of the cylinder, the second fluid is obstructed by the cylinder wall and the first hole structures, and the conversion effect of an impinging stream is greatly improved under the effect of cavitation, shearing and re-impinging, so that conversion from kinetic energy to molecular internal energy of the fluid in a high efficiency state, and chemical reaction of unreacted raw materials in products discharged from the microreactors 20 is further finished. The included angle is formed between the axial direction of each first hole structure and the axial direction of the cylinder, preferably being 165-195°.

In one preferred embodiment, a cylinder is provided with inlets at the two ends, a mixing vessel 10 is provided with two groups of reaction product inlets 101, each group of which includes at least one reaction product inlet 101, and the two groups of the reaction product inlets 101 are arranged on the two sides of the mixing vessel 10 respectively, wherein a part of reaction product outlets 202 are connected with one group of the reaction product inlets 101 respectively, the other part of the reaction product outlets 202 are connected with the other group of the reaction product inlets 101 respectively, and hydrogenation reaction products entering from the two groups of reaction product inlets 101 enter the cylinder from the inlets at the two ends of the cylinder in a manner of an ejection fluid and are subjected to non-submersed impinging.

In one preferred embodiment, an inlet is formed in one end of the cylinder, and an impinging bottom plate is arranged at the other end of the cylinder; or an inlet is formed in one end of the cylinder, a radial sectional area of the cylinder is gradually reduced in a direction far away from the inlet end, and the other end of the cylinder is closed, wherein the reaction product inlets 101 are all connected with the inlet end of the cylinder to be used for enabling the hydrogenation reaction products to enter the cylinder in the manner of the ejection fluid and are subjected to non-submersed impinging.

Structures of other non-submersed impinging assemblies may also adopt a concrete structure mentioned in China Patent 201910320253.X, which is not further described here.

In one preferred embodiment, a non-submersed impinging stream assembly 11 is arranged at the position, close to the top end, of the cavity of the mixing vessel 10.

In one preferred embodiment, each microreactor is of a tubular structure with a length-diameter ratio of (10-20) to 1. Such arrangement is more beneficial to the conversion rate and the efficiency of hydrogenation reaction. Preferably, each microreactor is a cylindrical reactor with an inside diameter being 50-100 mm, a length being larger than or equal to 500 mm and a preferable length being 500-3000 mm.

In order to further improve the reaction efficiency, in one preferred embodiment, each microreactor 20 is further internally provided with a plurality of pipeline cavitation plates, each of which is provided with a plurality of second hole structures. The concrete pipeline cavitation plates may adopt a common type in the art. Otherwise, each microreactor 20 may further be provided with an ultrasonic apparatus, plasma equipment, a laser emitting apparatus or other light source technologies, an electromagnetic field generation apparatus and the like. Other hearing technologies and impinging technologies may further be used to strengthen hydrogenation reaction. Particularly, when the differential hydrogenation reaction apparatus is used as a differential ambient-pressure reaction apparatus, the above strengthening means is more important for improving the hydrogenation reaction efficiency and conversion.

Figure 4:
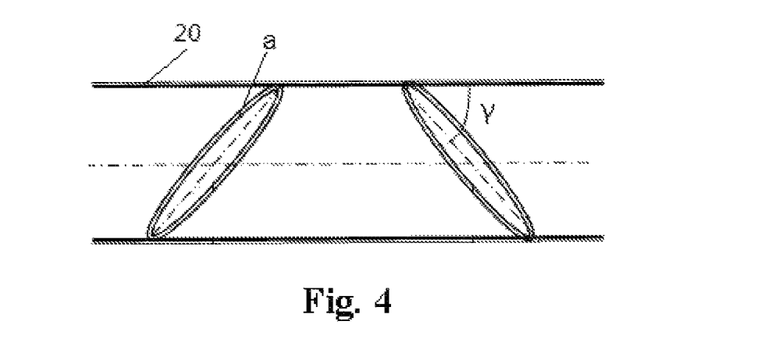
FIG. 4 shows a structural diagram of an arrangement of a pipeline cavitation plate a in differential hydrogenation reaction apparatus according to another embodiment.

More preferably, as shown in FIG. 4, pipeline cavitation plates a are vertically and obliquely arranged in the corresponding microreactor 20 in an axial direction. Therefore, the differential hydrogenation reaction apparatus has more effectively strengthening effect and is beneficial to further improve the reaction efficiency. Further preferably, two adjacent pipeline cavitation plates are the same or opposite in an oblique direction in each microreactor 20. A specific inclined angle γ is preferably 30-60°.

In one preferred embodiment, the differential hydrogenation reaction apparatus further includes a heating apparatus, and the heating apparatus is used for heating microreactors 20 and a mixing vessel 10. A required temperature environment may be provided to hydrogenation reaction by the heating apparatus. More preferably, as shown in FIG. 3, the forced circulation apparatus 30 further includes pipeline type heating furnaces 33, and the pipeline type heating furnaces 33 are used for heating the circulation pipeline 31. More preferably, the circulation pipeline 31 is further provided with hydrogen inlets 311 to be used for introducing hydrogen into the circulation pipeline 31. Therefore, hydrogen is supplemented in the materials cycling into the microreactors 20, and hydrogenation reaction of the unreacted raw materials is facilitated.

A light product may be generally produced in the hydrogenation reaction process, and unreacted hydrogen and other by-product gases may also be produced in the product. In one preferred embodiment, a gaseous product outlet 103 is further formed in the top of the mixing vessel 10, the differential hydrogenation reaction apparatus further includes a condenser 40, the condenser 40 is provided with a gaseous product inlet, a condensate outlet and a tail gas outlet, and the gaseous product inlet is connected with the gaseous product outlet 103. Therefore, light oil is discharged from a condensate outlet to be separated by the condenser 40, and the hydrogen and a part of other by-product gases are exhausted as tail gas. More preferably, the tail gas outlet is connected with the hydrogen inlets 311. Therefore, on one hand, the hydrogen in tail gas may be utilized, and on the other hand, desulfurization and denitrogenation treatment may be performed on the tail gas by the microreactors under the effect of the hydrogen. Preferably, the reaction apparatus further includes a condensate receiving apparatus 50 which is connected with a condensate outlet of the condenser 40 and is used for receiving the discharged light oil product.

Hydrogenation reaction generally needs to be catalyzed by a catalyst, and in the actual running process, the catalyst may be used as a dilute phase to be dispersed in the liquid phase raw materials and enter the microreactors 20 for catalytic reaction. In one preferred embodiment, each microreactor 20 is filled with a hydrogenation catalyst. Therefore, on one hand, maintenance of the equilibrium in the hydrogenation reaction process is more facilitated; and on the other hand, wear of the apparatus caused by continuous circulation of the catalyst can also be effectively prevented, and the utilization rate of the catalyst can also be increased. Except a cavity is added with a cavitation component, filled with the hydrogenation catalyst and the like, a high electric field component, a photocatalysis component and the like may further be added in the reactor to be used for promoting execution of hydrogenation reaction. One of the arrangements may be selected, and the arrangements may also be arranged at the same time, for example, the photocatalysis component is added at the same time and is filled with the hydrogenation catalyst, which may be flexibly selected according to different hydrogenation reaction types. Furthermore, other strengthening components may also be added according to the catalysis type to be used for improving the catalysis efficiency, and certainly, the cavity may not be added with any strengthening component neither.

In a word, by adopting the reaction apparatus of the present disclosure, the problems of unsafety and non-equilibrium of high pressure generally existing in the hydrogenation reaction process at present can be effectively solved, and the reaction efficiency is also relatively high. The differential hydrogenation reaction apparatus of the present disclosure is compared with a traditional reactor as follows:

| Type | Large Integral Reactor, Ultra-large Integral Reactor | Small Differential Reactor, Ultra-small Differential Reactor |
|---|---|---|
| Mathematical Expression | $\int f(x)dx$ | $\Sigma \Delta f(x')/\Delta x$ |
| Capacity/V | $V \geq 5\ m^3$ | $V < 0.025\ m^3$ (Inside Diameter DN < 0.1 m) |
| Material Retention Time/h, ms | 0.5 h-1.5 h (meeting the lowest requirement for disequilibrium degree of reaction) | >1 ms (higher than 1-2 orders of time required for breakage-bonding of molecular bonds) |
| Number of Reactor/N | N = 1 | N ≥ 1 (set in parallel connection and auxiliary serial connection according to the demands of the yield) |

In the present disclosure, the differential hydrogenation reaction apparatus is generally adapted to hydrogenation reaction of the liquid raw materials, for example: production of sorbitol with hydrogenation of glucose, hydrocracking, such as residual oil ambient-pressure hydrocracking, ring opening with hydrogenation of aromatics, hydrodesulfurization and hydrodenitrogenation, desulfurization and denitrification with hydrogenation of the tail gas and the like.

The present application will be further described in detail with reference to the specific embodiments below, and these embodiments should not be interpreted as limiting the claimed protective scope of the present application.

The process conditions of producing the sorbitol with hydrogenation of glucose are compared by embodiment 1 and comparative example 1 below:

Embodiment 1

The sorbitol is produced with hydrogenation of the glucose by adopting the differential hydrogenation reaction apparatus of the present disclosure, the liquid phase reaction raw material contains glucose and deionized water; and by adopting the two serial groups of the differential hydrogenation reaction apparatuses, each differential hydrogenation reaction apparatus includes a mixing device and two, pressurized microreactors arranged in parallel with one for standby and one for use. The reaction process conditions are as follows: the capacity of each microreactor is smaller than or equal to 0.025m3; the reaction temperature is 140V; and for a non-pressured vessel, the inside diameter of each microreactor is 40 mm, the length-diameter ratio L:DN (10-25):1 (in the embodiment, the reactors with different length-diameter ratios, and a result is as follows), a flow velocity of the reaction raw material in each microreactor is 12 m/s, and the running time is 1 h. The yield of the sorbitol in the process is 80-90%.

Comparative Example 1

The sorbitol is produced with hydrogenation of the glucose by adopting a discontinuous production mode of a traditional high-pressure stirring reaction kettle, the liquid phase reaction raw material contains the glucose, deionized water and starch unreacted after fermentation (pure starch is fermented to be changed into the glucose after being fermented for about 3-5 days), and the reaction process conditions are as follows: for the reaction, the capacity is 3-5m3, the temperature is 140° C., the pressure is 5-10 MPa, and the stirring velocity is 300-600 r/min (with a stirring paddle and with the reaction time being 1 h). The yield of reaction is 50-60%.

The process conditions of residual oil ambient-pressure hydrocracking are compared by embodiments 2 and comparative example 2 below:

Embodiment 2

Residual oil ambient-pressure hydrocracking is performed by adopting the differential hydrogenation reaction apparatus of the present disclosure, the liquid phase reaction raw material is vacuum residuum, adopted is the differential hydrogenation reaction apparatus, as shown in FIG. 3, which includes a mixing apparatus and four parallel microreactors (which are I, II, III and IV from left to right respectively, wherein I and II are one group with a same feed liquid, and III and IV are one group with a same feed liquid; the microreactors I and II on the left side are pressurized microreactors with the capacity V1 smaller than or equal to 0.025 m3 according to specifications of Chinese Standard, the inside diameter DN smaller than 0.1 m and the length-diameter ratio L:DN equal to 10-25:1; and the microreactors III and IV on the right side are ambient-pressure microreactors with the capacity V1 smaller than or equal to 0.01 m3 according to specifications of Chinese Standard, the inside diameter DN smaller than 0.1 m and the length-diameter ratio L:DN equal to 10-25:1), reaction product outlets are formed in the bottom of the mixing apparatus and are connected with the inlets of the microreactors to enable the reaction products to cycle to the microreactors, and each circulation pipeline is provided with a forced circulation pump. A gasous light oil and tail gas outlet is formed in the top end of the vessel, light oil is condensed into a liquid phase by the condenser, and residual gas phases are sent into the microreactors by a vacuum pump.

The mixing apparatus is an ordinary ambient-pressure vessel, a volume of the mixing apparatus is 100 m3, a material volume is 65m3, 35% space is reserved to be used for performing non-submersed impinging secondary reaction on the materials of the microreactors after the materials enter the vessel, and an ejection velocity of the materials of the microreactors at the outlets is between 50 m/s and 60 m/s in the impinging process. Each microreactor is internally provided with a tubular cavitation plate as shown in FIG. 4 and filled with a hydrogenation catalyst which is a millimeter-scale molybdenum-nickel-contained catalyst; the reaction process conditions are as follows: the reaction temperature is 350-420° C., the pressure is 0.08-0.1 MPa, and a hydrogen-oil rate is 100. A circulation oil pipeline and a base oil discharge pipeline are arranged at the bottom of the mixing vessel; an upper space of the vessel is provided with a non-submersed impinging component, and all materials are sent from the microreactors into the vessel by the liquid pump for non-submersed strengthening secondary reaction after being subjected to first reaction in the microreactors. Feeding of the microreactors I and II uses one centrifugal pump as power for movement of the materials, and a flow rate of the centrifugal pump V2 is 3500m3/h; the pressure of each microreactor is 1.5-2.5 MPa; the cycle number of the 65m3 materials in the vessel in the two microreactors I and II on the left side is 27.6 times/h, the total cycle quantity of the materials in the two microreactors is 55 times/h, and full reaction of the materials is guaranteed; the microreactors III and IV are fixed-bed microreactors running in parallel, each reactor is filled with a desulfuration and denitrogenation catalyst, and sulfur and nitrogen in a gasous light product is removed under the effect of the hydrogen in the tail gas; the two microreactors III and IV are in ambient-pressure operation with the temperature no lower than 410° C.; and the total cycle number of the materials is approximate to the microreactors on the left side. The output end of the pump is provided with a tubular heating furnace to enable the materials to be rapidly heated to 350-420° C.; and the reaction process conditions are as follows: the temperature is 350-420° C., the pressure is 0.1 MPa, the hydrogen-oil rate is 200, and the retention time of the materials in the reactors is 1 h.

A reaction result is as follows: a light oil extraction rate is 40-60%.

Comparative Example 2

Residual oil high-pressure hydrocracking is performed by adopting a traditional slurry-bed hydrogenation apparatus, the liquid phase reaction raw material is vacuum residuum, and the hydrogenation catalyst is a solid coke absorption catalyst. The size and the capacity of each reactor are as follows: a material volume is 62t/0.95, and the residual oil density is 65m3.

The total volume of each reactor 65m3/65% (the materials account for 65% of the reactor)=100m3; and the sizes of each reactor are as follows: the inside diameter $\phi$ is 3 m, the effective height is 14 m, and the wall thickness if 0.33 m. Matching equipment: a hydrogen washing and recovering apparatus, a high-pressure separator, a low-pressure separator and a high-pressure fixed-bed hydrogenation reactor.

The reaction process conditions are as follows: the temperature is 450-470° C., the pressure is 30 MPa, the hydrogen-oil rate is 1000, and the retention time of the materials in the reactors is 1 h.

A reaction result is as follows: a light oil extraction rate is 30-60%, the productivity is 18.6-37.2T/h, and the yield is 62t/h.

It is noted that the reaction temperature in the comparative example 2 is 450-470° C., and the residual oil is largely coked in reaction, so that cokes needs to be absorbed by using the catalyst. However, in the embodiment 2 of the present disclosure, high pressure does not exist, and the temperature is relatively low, so that the desulfurization and denitrogenation catalyst is adopted.

Furthermore, ambient-pressure hydrogenation is a difficult problem in the world and is never implemented in the industrial field or a laboratory. Known from the embodiments 1 and 2, the differential hydrogenation reaction apparatus of the present disclosure is used to realize glucose hydrogenation and vacuum residuum hydrocracking at ambient pressure (0.1 MPa), which is a big breakthrough.

What stated above are merely preferred embodiments of the present disclosure but are not used to limit the present disclosure, and various modifications and variations can be made in the present disclosure to those skilled in the art. Any modifications, equivalent substitutions, improvements and the like within the spirit and principles of the present disclosure are intended to be embraced by the protection range of the present disclosure.

What is claimed is:

1. A differential hydrogenation reaction apparatus, comprising:
a mixing vessel with reaction product inlets;
a plurality of microreactors used as hydrogenation reaction places of a liquid phase reaction raw material, wherein each of the microreactor is provided with a liquid phase reaction raw material inlet and a reaction product outlet; the reaction product outlet is connected with the corresponding reaction product inlet; the plurality of microreactors are divided into one group or a plurality of groups which are arranged in parallel, each group comprises at least one microreactor arranged in parallel; each of the microreactor in each group of the microreactors is a pressurized microreactor with a volume smaller than or equal to 0.025 m³ and an inside diameter smaller than 0.1 m, or an ambient-pressure microreactor with a volume smaller than or equal to 0.1 m³ and an inside diameter smaller than 0.1 m; and the pressure of each microreactor is matched with the pressure of a pump for the input material and the inside diameter of the reactor outlet to meet the needs for the pressure in the vessel.

2. The differential hydrogenation reaction apparatus according to claim 1, wherein the mixing vessel is further provided with a mixed material outlet; the differential hydrogenation reaction apparatus further comprises a forced circulation apparatus, and the forced circulation apparatus comprises:
a circulation pipeline, an inlet of which is connected with the mixed material outlet and an outlet of which is connected with the liquid phase reaction raw material inlet; and
a forced circulation pump arranged on the circulation pipeline.

3. The differential hydrogenation reaction apparatus according to claim 1, wherein the mixing vessel is provided with a cavity; the cavity is internally provided with a non-submersed impinging stream assembly; the non-submersed impinging stream assembly is used for further performing non-submersed impinging, cavitation and shearing on a hydrogenation reaction product which enters from the reaction product inlet and goes out from the microreactors.

4. The differential hydrogenation reaction apparatus according to claim 3, wherein the non-submersed impinging stream assembly comprises a cylinder; an inner cavity of the cylinder is used for providing a non-submersed impinging place; a wall of the cylinder is provided with a plurality of first hole structures; and an included angle is arranged between an axial direction of each first hole structure and an axial direction of the cylinder.

5. The differential hydrogenation reaction apparatus according to claim 4, wherein the cylinder is provided with inlets at the two ends; the mixing vessel is provided with two groups of reaction product inlets, each group of which comprises at least one reaction product inlet, and the two groups of the reaction product inlets are arranged on the two sides of the mixing vessel respectively, wherein a part of the reaction product outlets are connected with one group of the reaction product inlets respectively, the other part of the reaction product outlets are connected with the other group of the reaction product inlets respectively, and the hydrogenation reaction products entering from the two groups of reaction product inlets enter the cylinder from the inlets at the two ends of the cylinder in a manner of an ejection fluid and are subjected to non-submersed impinging.

6. The differential hydrogenation reaction apparatus according to claim 4, wherein an inlet is formed in one end of the cylinder, and an impinging bottom plate is arranged at the other end of the cylinder; or an inlet is formed in one end of the cylinder, a radial sectional area of the cylinder is gradually reduced in a direction far away from the inlet end, and the other end of the cylinder is closed, wherein
the reaction product inlets are all connected with the inlet end of the cylinder to be used for enabling the hydrogenation reaction products to enter the cylinder in the manner of the ejection fluid and are subjected to non-submersed impinging.

7. The differential hydrogenation reaction apparatus according to claim 3, wherein the non-submersed impinging stream assembly is arranged at the position, close to the top end, of the cavity of the mixing vessel.

8. The differential hydrogenation reaction apparatus according to claim 1, wherein each of the microreactor is of a tubular structure with a length-diameter ratio of (10-20) to 1.

9. The differential hydrogenation reaction apparatus according to claim 8, wherein each microreactor is further internally provided with a plurality of pipeline cavitation plates, each of which is provided with a plurality of second hole structures.

10. The differential hydrogenation reaction apparatus according to claim 9, wherein the pipeline cavitation plates are vertically or obliquely arranged in the corresponding microreactors in an axial direction.

11. The differential hydrogenation reaction apparatus according to claim 10, wherein two adjacent pipeline cavitation plates are the same or opposite in an oblique direction in each microreactor.

12. The differential hydrogenation reaction apparatus according to claim 1, wherein the differential hydrogenation reaction apparatus further comprises a heating apparatus, and the heating apparatus is used for heating the microreactors and the mixing vessel.

13. The differential hydrogenation reaction apparatus according to claim 2, wherein the forced circulation apparatus further comprises pipeline type heating furnaces, and the pipeline type heating furnaces are used for heating the circulation pipeline.

14. The differential hydrogenation reaction apparatus according to claim 13, wherein the circulation pipeline is further provided with hydrogen inlets to be used for introducing hydrogen into the circulation pipeline.

15. The differential hydrogenation reaction apparatus according to claim 14, wherein a gaseous product outlet is further formed in the top of the mixing vessel; the differential hydrogenation reaction apparatus further comprises a condenser; the condenser is provided with a gaseous product inlet, a condensate outlet and a tail gas outlet; and the gaseous product inlet is connected with the gaseous product outlet.

16. The differential hydrogenation reaction apparatus according to claim 15, wherein the tail gas outlet is connected with the hydrogen inlets.

17. The differential hydrogenation reaction apparatus according to claim 1, wherein each microreactor is filled with a hydrogenation catalyst, and/or is added with a high electric field component and/or is added with a photocatalysis component.

* * * * *